Figure 1:
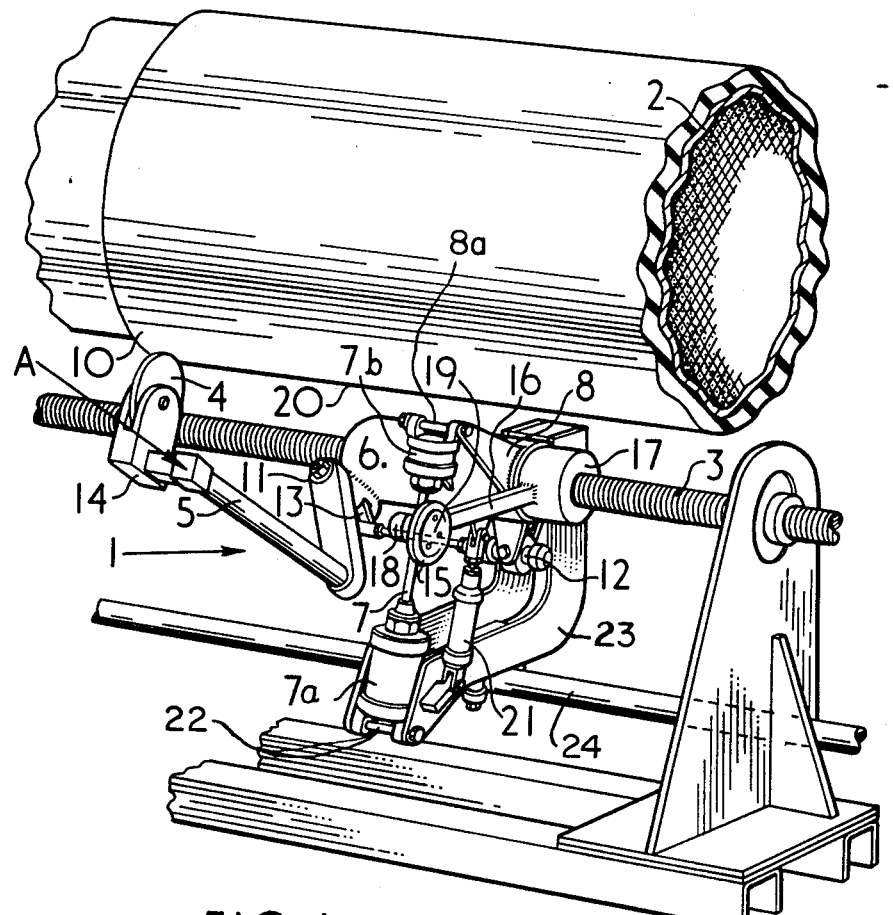

United States Patent [19]
Askam et al.

[11] 3,737,356
[45] June 5, 1973

[54] APPARATUS FOR CONSOLIDATING AT LEAST THE BEAD PORTION OF A TIRE CARCASS

[75] Inventors: John F. Askam, Sutton Coldfield; Charles Goodwin, Alrewas, both of England

[73] Assignee: The Dunlop Company Limited, London, England

[22] Filed: Oct. 28, 1970

[21] Appl. No.: 84,879

Related U.S. Application Data

[63] Continuation of Ser. No. 711,727, March 8, 1968, abandoned.

[30] Foreign Application Priority Data

Mar. 17, 1967 Great Britain...................12,614/67

[52] U.S. Cl. ...................156/402, 156/132, 156/421
[51] Int. Cl. ...........................................B29h 17/12
[58] Field of Search....................156/410, 413, 421, 156/402

[56] References Cited

UNITED STATES PATENTS 2,936,023  5/1960  Giletta et al..........................156/410
3,031,353  4/1962  Mallory..............................156/402
3,258,383  6/1966  Sabo et al...........................156/410

*Primary Examiner*—Robert F. Burnett
*Assistant Examiner*—C. B. Cosby
*Attorney*—Carroll G. Harper, Ward, Haselton, McElhannon, Brooks & Fitzpatrick

[57] ABSTRACT

A tire building machine comprising a rotatable tire building drum and a self-aligning freely rotatable spinning disc for consolidating the plies of a tire mounted on the drum around the bead portion of the tire. Means are provided for moving the mounting for the disc towards and away from the bead portion, for applying pressure thereto and for urging the disc in an arc around the bead portion to incline the disc into predetermined angular dispositions relative to the bead portion. The engagement of the disc with the bead limits the degree of arc rotation of the disc and thus defines the disposition of the plane of rotation of the disc with respect to the bead portion. A second spinning disc for consolidating components between the bead portions may also be provided.

9 Claims, 2 Drawing Figures

APPARATUS FOR CONSOLIDATING AT LEAST THE BEAD PORTION OF A TIRE CARCASS

This application is a continuation of Ser. No. 711,727, filed Mar. 8, 1968 now abandoned. This invention relates to the manufacture of pneumatic tires.

In the manufacture of pneumatic tires it is necessary to consolidate tire plies and/or other building components mounted on a building drum when they are being or have been turned around bead-rings and it is well-known to utilize freely rotatable spinning discs for this purpose. In previously designed apparatus of this kind it has been necessary to positively drive the mountings for the freely rotatable spinning discs by means of gear wheels or the like so as to traverse them around the profile of the bead portion of a tire during its manufacture and this requires expensive and complicated equipment.

It is an object of the present invention to provide a simple form of machinery utilizing spinning discs for the consolidation of at least the bead portion of pneumatic tires.

According to the invention a tire building machine comprises a rotatable tire building drum, a first freely rotatable spinning disc for engagement with a bead portion of a tire mounted on the drum, means for moving the said first disc towards or away from a bead portion of the tire and for applying pressure thereto, a rotatable pivotal mounting for the said disc ro allow the said disc to be moved in an arc around the bead portion and means for rotatably urging the said disc in an arc around the pivotal mounting to incline the said disc into predetermined angular dispositions relative to the bead portion, the disposition of the rotational axis of the pivotal mounting relative to the drum and thus to a bead portion thereon being such that engagement of the said disc with the bead portion limits the degree of arc rotation of the said disc around the pivotal mounting and thus defines the angular disposition of the plane of rotation of the said disc with respect to the bead portion.

Preferably the said first disc assumes, during at least part of its arcuate movement around the bead portion, a leading angular disposition relative to the bead portion, i.e., the angle which the plane of rotation of the said disc assumes relative to the bead portion is less than 90° with respect to the tangent drawn to the point of contact on the trailing side, with respect to disc traverse, of the said disc.

Figure 2:
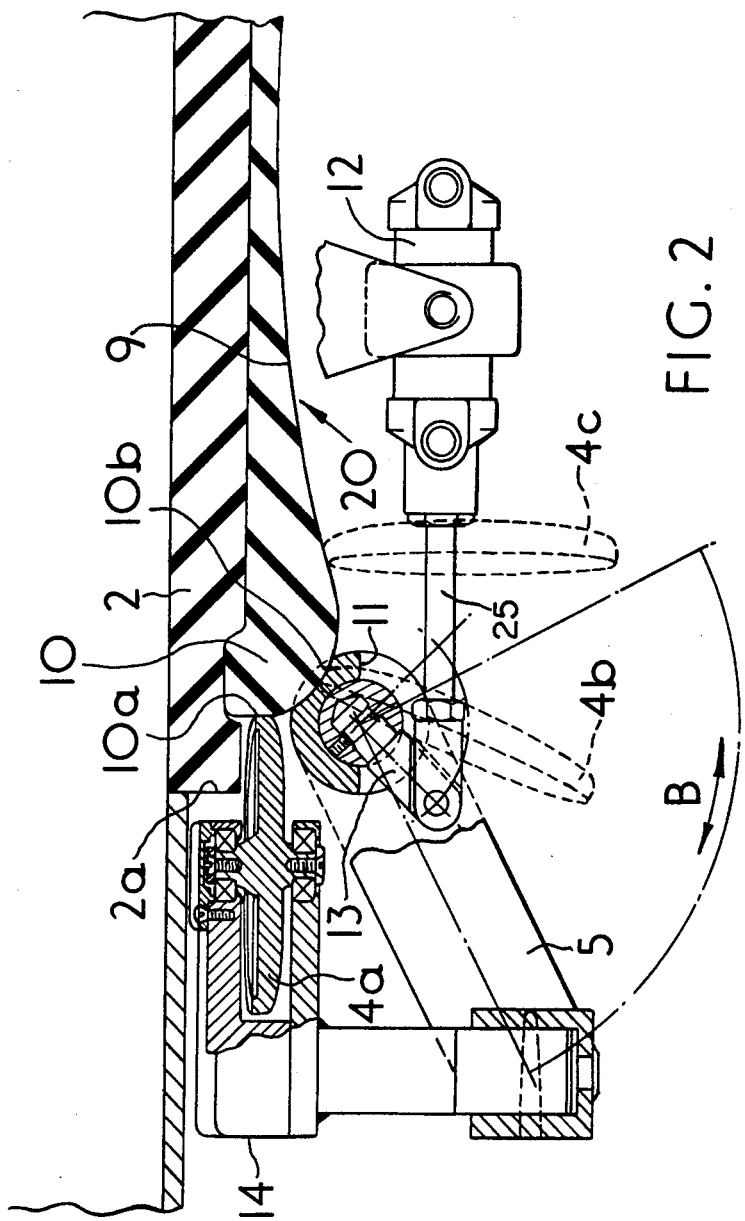

One embodiment of the invention will now be described by way of example with reference to the accompanying drawings of which:

FIG. 1 is a front perspective view of the machine at one end of the former showing one bead being consolidated, parts of the device being omitted for clarity, FIG. 2 is a part sectional view of the machine looking along the axis of the cranked arm in the direction of the arrow A in FIG. 1, showing the first disc at various stages of its traverse around the bead, certain parts being omitted for clarity.

For example, in one construction according to the invention, the rotatable pivotal mounting 11 for the disc 4 is itself mounted on a carriage 6 through which a lead screw comprising a traversing shaft 3 passes. The axis of the lead screw is parallel to the axis of the building drum and by rotating the screw the carriage 6, and hence the mounting 11 and the spinning disc 4, may be moved axially of the drum 2 or by the same action the disc 4 may be moved towards or away from the bead portion 10 of the tire on the drum 2 in an axial direction.

The assembly 1 at each end of the tire building drum 2 is similar and one only will be described, it being appreciated that a lead screw comprising a traversing shaft 3 utilized for moving the bead spinning discs 4 in an axial sense relative to the drum is, at the one end of the drum 2 provided with a left-hand screw-threaded portion (not shown) and associated nut (not shown) while at the other end of the drum the shaft is provided with a right-hand screw-threaded portion (not shown) and associated nut (not shown), rotation of the shaft in one direction causing simultaneous movement of the assembly at each end of the drum towards the equatorial plane of the drum, reverse rotation causing contrary movement apart.

The spinning disc 4 for one end of the drum is freely rotatably mounted on a cranked arm 5 mounted on the carriage 6 having a member 23 engaging the rod 24.

The arm 5 is movable in an arc (shown by arrow B in FIG. 2)—by rotation of the traversing shaft 3—around a pivotal mounting 11 so that the disc can move around the base 10a and nose 10b portion of a tire bead 10.

A single-stage piston and cylinder assembly 12 is mounted between the carriage and the mounting and arranged generally parallel to the drum axis so that on actuation it urges the disc in an arc around its pivotal mounting.

The second air piston and cylinder assembly 12 is connected to a lever 13 through a connecting rod 25, the lever 13 controlling the position of the arm 5 so that on operation of the piston and cylinder assembly 12 the disc 4 is urged in an arc around the bead portion 10 and provide axial pressure.

If the assembly 12 is actuated and the lead screw rotated simultaneously the disc is moved in an arc around the bead portion to consolidate the components, the piston and cylinder assembly 12 providing the major part of the pressure of the disc on the bead portion in the axial direction.

Also, means are provided for moving the said disc into and out of engagement with the tire in a radical direction and for applying radial consolidating pressure. This means may comprise a two-stage double-acting piston and cylinder assembly 7 mounted between the carriage and the disc mounting perpendicular to the single-stage piston and cylinder assembly, the first stage being primarily for providing the radial movement and the second stage primarily the radial pressure for the components.

The two-stage double-acting air piston and cylinder assembly 7 is attached to the carriage at one end by a pin 22 and at the other end by a pin 8a on the arm 8 so that the spinning disc can be, by operation of one stage 7a of the air cylinder, move radially from a rest position (not shown) into a position 4a (see FIG. 2) in engagement with a radially extending base part 10a of a bead portion 10 of a tire 9 in cylindrical form mounted on the drum 2, the disc 4 in this position 4a being located with its plane of rotation parallel to the axis of the traversing shaft and thus parallel to the axis of rotation of the former. The second stage 7b of the air piston and cylinder is operable when the spinning disc is moved by rotation of the traversing shaft to a position 4c through a mid-position 4b so that its plane of rotation is located radially with respect to the tire building drum, the second stage of the air piston and cylinder providing, in this position of the disc, a generally radial force to assist in the consolidating operation.

It will be appreciated that the means for moving the said first disc towards or away from the bead portion and for applying pressure thereto and the means for rotatably urging the said disc in an arc around the pivotal mounting may comprise several constructional elements operable to work either in combination or separately to achieve the desired object.

The disposition of the axis of the pivotal mounting 11 of the arm relative to the shoulder 2a of the drum 2 and thus to a given beam portion on a tire mounted thereon is such that, during the spinning operation, while the drum 2 and the disc 4 are rotating, the movement of the disc 4 by the second air cylinder 12 into engagement with the bead portion 10, limits the degree of arc rotation of the arm 5 and the disc 4 around the axis, the angular disposition of the plane of rotation of the disc 4 with respect to the bead portion 10 thereby being set and controlled.

Stated another way, the pivotal mounting is disposed relative to the bead portion 10 so that engagement of the disc 4 with the bead portion 10 opposes rotation of the disc 4 around the pivotal mounting. This opposition to the rotation of the disc around the pivotal mounting causes the plane of rotation of the disc 4 to assume during rotation different angular dispositions with respect to the bead portion. It should be noted that as shown in FIG. 1 the top of the drum moves in a direction into the paper during rotation of the drum.

The axis of the arm 5 carrying the spinning disc 4 is not parallel to the plane of the disc the disposition of the disc being such that when this is viewed in a direction at right angles to the axis of its rotation and in a direction looking towards the drum (i.e., from left to right in FIG. 2) when the disc is disposed with its axis at right angles to a plane containing the axis of rotation of the drum 2 (i.e., disposed in position 4a), a circumferential plane of the disc is not tangential to a circumference of the drum but inclined at a small angle of between 2° and 5°, to a tangential line, in a trailing sense, this serving to provide a good standard of turn-down and to maintain the disc in intimate contact with the plies.

When the disc is moved from its initial position 4a in which its plane of rotation is parallel to the axis of the drum shaft, and as soon as possible before it reaches the mid-position 4b about halfway round the bead portion 10, the plane of rotation of the disc assumes a leading angular disposition, as earlier defined, it having been found that such a disposition of the disc improved the consolidating action. The simultaneous operation of the second stage 7b of the two stage piston and cylinder assembly 7 and the second piston and cylinder assembly 12 gives the final arcuate movement of the disc until it reaches the position 4c in which its plane of rotation is disposed radially with respect to the drum 2 this movement being accompanied by a change from the leading angular disposition of the disc to one in which the plane of rotation of the disc assumes neither a leading nor a lagging disposition, i.e. is disposed normally to the bead portion 10.

Thus the disc retains its leading angular disposition throughout a substantial portion of its arcuate movement from its initial position 4a to its radially disposed position 4c, the size of the portion being primarily determined by the tire geometry. The radial disposition of the disc as in position 4c allows consolidation of components in a direction parallel to the drum periphery.

A second freely rotatable spinning disc separate from the aforementioned first disc may be provided for consolidating tire building components located between the bead portions, the second disc being traversable by, for example, a lead screw.

Because of the mounting 14 and the designed disposition of the cranked arm 5 the bead spinning disc 4 cannot be used to consolidate the components over the whole of the peripheral area 20 of the tire 9 on the drum between the lead 10 and the drum equator since this mounting will foul the mounting for the spinning disc for the other bead. To consolidate the components in the area at one side of and adjacent to the drum equator a second spinning disc 15 is provided in each assembly, i.e., one for each side of the equator, this disc 15 being mounted on an arm 16 attached to a carriage 17 mounted on the traversing shaft axially inwardly of the carriage 6 for the bead spinning disc 4. This second disc is freely rotatable but arranged with its plane extending substantially radially of the drum 2. The mount 18 for this second disc is arranged wholly on the axially outer side (with respect to the drum) of the disc, the disc being provided on the axially inner side with a flat face 19 which will meet with the flat face on the corresponding disc on the other side of the drum equator. In operation these two second discs i.e. one on each side of the drum equator, are moved into engagement with the surface 20 of the tire components at the drum equator by operating further piston and cylinder mechanism 21 pivotally connected to the arm 16 after the first discs have completed the consolidation of the plies around the beads and on the drum periphery near the beads and have been moved away from the tire. The second discs 15 are then caused to traverse a predetermined distance axially outwardly with respect to the drum by rotating the traverse shaft and thereby consolidate plies and/or any other applied tire building component.

It is an advantage of an apparatus of this form that the first spinning disc aligns itself during the consolidating operation according to the shape of the bead portion and according to the disposition of the axis of the pivotal mounting of the arm on the carriage since such an arrangement is of simpler design than one in which the disposition of the disc is determined by a mechanism.

We claim:

1. A tire building machine comprising a rotatable tire building drum, a first freely rotatable spinning disc for engagement with a bead portion of a tire mounted on the drum, a freely rotatably pivotal mounting for said disc to allow said disc to be rotated in an arc around the bead portion, first means for disposing the rotational axis of the pivotal mounting relative to said drum and thus a bead portion thereon at a position where engagement of the said disc with the bead portion opposes rotation of the said disc in said arc around said pivotal mounting and causes the plane of rotation of said disc to assume different angular dispositions with respect to the bead portion, second means for urging said disc against said bead portion as said disc is rotated in an arc around said bead portion and third means for rotatably urging said disc about said pivotal mounting and in an arc around said bead portion whereby the plane of rotation of said disc assumes successively different predetermined angular dispositions relative to the bead portion.

2. A tire building machine according to claim 1 wherein said first means is disposed such that the first disc assumes, during at least part of its arcuate movement around the bead portion, a leading angular disposition relative to the bead portion.

3. A tire building machine according to claim 1 wherein said first means is disposed such that the first disc assumes, as soon as possible during its arcuate movement around the bead portion, a leading angular disposition relative to the bead portion, and retains this said disposition throughout a substantial portion of its said movement.

4. A tire building machine according to claim 1 wherein the first spinning disc is mounted with respect to said pivotal mounting with its circumferential plane inclined in a trailing sense, at an angle of between 2° and 5° to a tangent to the drum circumference at the point of contact between disc and drum when the disc is disposed with its axis at right angles to a plane containing the axis of rotation of the drum and when viewed in a direction at right angles to the axis of rotation of said disc and in a direction looking towards the drum.

5. A tire building machine according to claim 1 wherein said second and third means includes a lead screw arranged parallel to and spaced apart from the drum axis, a carriage mounted on said lead screw and movable in a direction parallel to the drum axis by rotation of the lead screw, the pivotal mounting for the first disc being attached to the carriage.

6. A tire building machine according to claim 5 wherein said second and third means further includes a single stage piston and cylinder assembly connected between the pivotal mounting and the carriage, actuation of the said assembly urging the first disc in an arc around said mounting.

7. A tire building machine according to claim 6 wherein simultaneous rotation of the lead screw and actuation of the piston and cylinder assembly causes the first disc to move in an arc around the bead portion to consolidate the components of the tire.

8. A tire building machine according to claim 5 wherein said second means further includes a two-stage piston and cylinder assembly connected between the pivotal mounting and the carriage in a direction generally perpendicular to the drum axis, actuation of the first stage of the assembly providing radial movement of the first disc between an inoperative position and a position where it engages with the tire and actuation of the second stage providing consolidating pressure for the components of the tire.

9. A tire building machine according to claim 1 comprising a second freely rotatable spinning disc arranged with its plane of rotation radially of the drum, said second disc being movable radially of the drum between an inoperative position and a position where it engages with the surface of the tire on the drum and movable axially of the drum to consolidate the tire building components between the tire bead portions.

* * * * *